United States Patent
Shaw, II et al.

(10) Patent No.: US 10,467,172 B2
(45) Date of Patent: Nov. 5, 2019

(54) INTERCONNECT FOR SHARED CONTROL ELECTRONICS

(71) Applicant: Seagate Technology LLC, Cupertino, CA (US)

(72) Inventors: John Wayne Shaw, II, Frederick, CO (US); Philip Jurey, Longmont, CO (US); Robert John Dore, Jr., Thornton, CO (US); Anthony John Pronozuk, Loveland, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 209 days.

(21) Appl. No.: 15/170,750

(22) Filed: Jun. 1, 2016

(65) Prior Publication Data

US 2017/0351632 A1    Dec. 7, 2017

(51) Int. Cl.
G06F 13/40 (2006.01)
G06F 13/16 (2006.01)

(52) U.S. Cl.
CPC ...... *G06F 13/4068* (2013.01); *G06F 13/1694* (2013.01)

(58) Field of Classification Search
CPC .............. G06F 13/4068; G06F 13/1694
See application file for complete search history.

(56) References Cited

U.S. PATENT DOCUMENTS

| | | | |
|---|---|---|---|
| 3,958,088 A * | 5/1976 | Vieri ................ | G06F 13/22 178/3 |
| 5,012,815 A * | 5/1991 | Bennett, Jr. ............ | A61B 7/04 600/512 |
| 5,504,882 A | 4/1996 | Chai et al. | |
| 5,678,023 A | 10/1997 | Adams et al. | |
| 5,778,374 A | 7/1998 | Dang et al. | |
| 6,310,815 B1 * | 10/2001 | Yamagata ................ | G11C 5/14 365/230.03 |
| 6,332,139 B1 | 12/2001 | Kaneko et al. | |
| 6,560,155 B1 | 5/2003 | Hush | |
| 6,766,420 B2 | 7/2004 | Rawson, III | |
| 6,959,399 B2 | 10/2005 | King et al. | |
| 6,986,075 B2 | 1/2006 | Ackaret et al. | |
| 7,124,272 B1 | 10/2006 | Kennedy et al. | |

(Continued)

FOREIGN PATENT DOCUMENTS

WO    2014-065841 A1    5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.

(Continued)

*Primary Examiner* — Henry Tsai
*Assistant Examiner* — John B Roche
(74) *Attorney, Agent, or Firm* — Holzer Patel Drennan

(57) ABSTRACT

A mass data storage system includes a number of communicatively coupled storage drives powered and controlled by shared control electronics. The shared control electronics are configured to transmit analog read/write signals through an interconnect to each of the multiple individually selectable storage drives. The interconnect bi-directionally couples the control electronics to each of the multiple selectable storage drives.

20 Claims, 5 Drawing Sheets

(56) References Cited

U.S. PATENT DOCUMENTS

| | | | |
|---|---|---|---|
| 7,210,005 B2 | 4/2007 | Guha et al. | |
| 7,237,129 B2 | 6/2007 | Fung | |
| 7,318,164 B2 | 1/2008 | Rawson, III | |
| 7,334,140 B2 | 2/2008 | Jones et al. | |
| 7,434,090 B2 | 10/2008 | Hartung et al. | |
| 7,443,759 B1 | 10/2008 | Rowlands et al. | |
| 7,516,348 B1 | 4/2009 | Ofer | |
| 7,568,122 B2 | 7/2009 | Mechalke et al. | |
| 7,699,023 B2 | 2/2010 | Murase | |
| 7,673,167 B2 | 3/2010 | Elliott et al. | |
| 7,702,853 B2 | 4/2010 | Hetzler et al. | |
| 7,859,834 B2 | 12/2010 | Fukuda et al. | |
| 8,024,602 B2 | 9/2011 | DeCenzo et al. | |
| 8,127,165 B2 | 2/2012 | Qi et al. | |
| 8,161,317 B2 | 4/2012 | Ishii et al. | |
| 8,412,986 B2 | 4/2013 | Ishii et al. | |
| 8,473,779 B2 | 6/2013 | Siewert et al. | |
| 8,495,276 B2 | 7/2013 | Han et al. | |
| 8,522,058 B2 | 8/2013 | Chang et al. | |
| 8,583,838 B1 | 11/2013 | Marshak et al. | |
| 8,947,816 B1 | 2/2015 | Ryan et al. | |
| 2005/0228943 A1 | 10/2005 | DeCenzo et al. | |
| 2006/0004868 A1 | 1/2006 | Claudatos et al. | |
| 2006/0062383 A1 | 3/2006 | Kaneda et al. | |
| 2006/0098804 A1* | 5/2006 | Larzabal | H04B 3/36 379/346 |
| 2007/0220316 A1 | 9/2007 | Guha | |
| 2009/0089504 A1 | 4/2009 | Soran et al. | |
| 2009/0150593 A1 | 6/2009 | Hamilton et al. | |
| 2009/0249003 A1 | 10/2009 | Bates et al. | |
| 2010/0011229 A1 | 1/2010 | Davis et al. | |
| 2010/0138677 A1 | 6/2010 | Pagan et al. | |
| 2011/0239013 A1 | 9/2011 | Muller | |
| 2012/0210169 A1 | 8/2012 | Coile et al. | |
| 2012/0233484 A1 | 9/2012 | Rossi | |
| 2012/0272038 A1 | 10/2012 | Wei et al. | |
| 2012/0297114 A1 | 11/2012 | Koizumi et al. | |
| 2013/0304963 A1 | 11/2013 | Luo et al. | |
| 2014/0263861 A1* | 9/2014 | Pritchard | B61C 17/12 246/187 R |
| 2014/0281194 A1 | 9/2014 | Gaertner et al. | |
| 2014/0297700 A1 | 10/2014 | Vongsouvanh et al. | |
| 2015/0026488 A1 | 1/2015 | El-Batal et al. | |
| 2015/0052275 A1* | 2/2015 | Maroney | G06F 13/4068 710/301 |
| 2015/0197330 A1 | 7/2015 | Mayer et al. | |
| 2015/0331476 A1 | 11/2015 | Slik | |
| 2015/0331632 A1 | 11/2015 | Slik | |
| 2015/0362968 A1 | 12/2015 | Jurey et al. | |
| 2015/0362972 A1 | 12/2015 | Frick | |
| 2015/0362983 A1 | 12/2015 | Frick | |
| 2015/0363109 A1 | 12/2015 | Frick | |
| 2015/0363126 A1 | 12/2015 | Frick | |
| 2015/0363127 A1 | 12/2015 | Frick | |
| 2015/0363288 A1 | 12/2015 | Frick | |
| 2017/0270060 A1* | 9/2017 | Gupta | G06F 13/102 |
| 2017/0300445 A1* | 10/2017 | McKnight | G06F 13/4027 |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seagate, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from: http://www.quantum.com/serviceandsupport/softwareanddocumentationdownloads/dx100/index.aspx.

* cited by examiner

INTERCONNECT FOR SHARED CONTROL ELECTRONICS

SUMMARY

Implementations disclosed herein provide for a system with control electronics shared by multiple selectable storage drives. The control electronics are configured to transmit analog read/write signals through an interconnect and to each of the multiple individually selectable storage drives.

Implementations disclosed herein still further provide a method for selectively reading or writing data to one of multiple selectable storage drives with shared control electronics. The method comprises transmitting an analog read/write signal from a shared controller, the analog read/write signal directed to a target storage drive among a plurality of selectable storage drives coupled to the shared controller. The method further comprises directing the analog read/write signal through an interconnect that bi-directionally couples each of the plurality of selectable storage drives to the shared controller.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
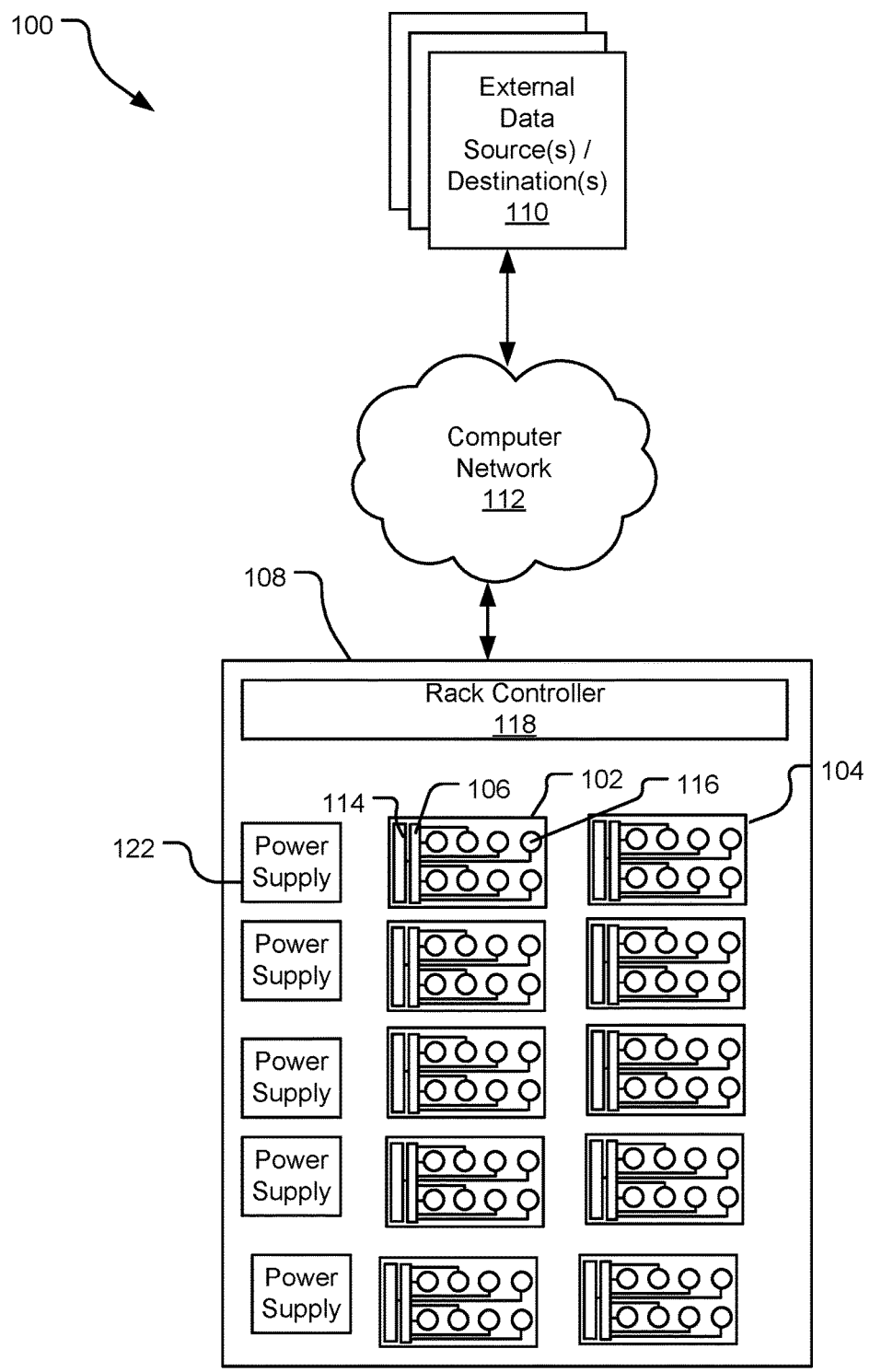
FIG. 1 illustrates an example off-line mass data storage system with multiple media units each including interconnect hardware that allow multiple storage resources to share control electronics while remaining independently serviceable and replaceable.

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle drives ("MAID")). MAID systems archive data in an array of HDDs that are operating in a standby power state, most of which are not spinning. The MAID system spins up each HDD on demand when desired to perform data access operations on a disk within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD much faster than that of off-line tape mass data storage while maintaining build and operating costs competitive with off-line tape mass data storage. This is accomplished, in part, with a common controller operating multiple storage resources via an array of switches in a mass storage system.

Serviceability is one primary concern in designing storage systems with control electronics that are shared between by multiple storage resources. If, for example, multiple storage resources (e.g., hard drives) are coupled to a common controller and powered by a same power source, the storage resources may not be individually accessible for servicing and/or replacement. For instance, the smallest Field Replaceable Unit (FRU) in some off-line HDD mass data storage systems is a physical unit that includes multiple storage resources that are taken off-line collectively to repair or replace any individual storage resource in the FRU. The herein disclosed technology provides solutions that allow for a reduction in the size of a FRU within an off-line HDD mass data storage system to that of a single storage resource (e.g., a single hard drive) regardless of how many storage resources are coupled to shared electronic controls.

According to one implementation of the disclosed technology, shared control electronics are integrated on a printed circuit board assembly (PCBA) located remote from an array of communicatively coupled storage resources. Digital control signals are received and processed on the PBCA, converted to analog control signals, and transmitted from the PCBA through an interconnect to the respective storage resources. The disclosed solutions make use of signal amplification and attenuation techniques to mitigate or prevent substantial degradation of signals traveling between the shared control electronics and the array of multiple storage resources.

FIG. 1 illustrates an example off-line HDD mass data storage system 100 with multiple media units (e.g. media units 102, 104) each including interconnect hardware (e.g., an interconnect 106) that allows multiple storage resources to share control electronics while remaining independently-selectable, serviceable and replaceable. As used herein, "control electronics" may refer to various device controllers (e.g., microprocessors) as well as various electronics that implement selective decisions of device controllers, including electronics such as switches to select a preamplifier and configure preamplifier settings, switches to open appropriate read/write channels, switches to control the actuator movement for positioning various read/write heads; and/or switches to spin up or down a voice coil motor (VCM) or spindle motor on any one of the HDAs.

The off-line HDD mass data storage system 100 (e.g., a server cluster or farm) includes at least one rack (e.g., a rack 108), and may include multiple racks oriented in adjacent or separate physical locations or facilities. The off-line HDD mass data storage system 100 may accommodate any use of mass data storage (e.g., content delivery, backup, archiving, etc.).

Individual racks, such as the rack 108, may be interconnected to one another via a computer network 112 (e.g., an Ethernet or a custom interconnect network). Further, the storage racks may be connected to one or more external data source(s) and/or destination(s) 110 via the same computer network 112 or an additional interconnected network (e.g., a local area network ("LAN") or a wide area network ("WAN"), not shown). Communication between the storage racks (e.g., the rack 108), the computer network 112, and the external data source(s) and/or destination(s) 110 may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and the external data source(s) and/or destination(s) 110 as desired.

The rack 108 includes an array of media units, such as the media units 102 and 104. Each media unit is selectively powered by one or more power supplies and controlled by a rack controller (e.g., a rack controller 118). For example, one implementation of the storage rack 108 includes 10 individual media units (e.g., media units 102, 104) and 5 individual power supplies (e.g., power supply 122), all of which are configured to receive control instructions from the rack controller 118. In other implementations, some racks may not include a rack controller at all. The exact number of media units and power supplies within any given rack may vary considerably from one implementation to another and from one rack to another.

The power supplies (e.g., power supply 122) may power multiple media units or a single media unit. For example, the power supply 122 powers media units 102 and 104. In still other implementations, an individual power supply may power multiple racks.

Each of the media units (e.g., 102, 104) in the off-line HDD mass data storage system 100 includes a plurality of storage drives and a shared set of control electronics also referred to herein as a "media unit controller" or a "zone board" (e.g., a zone board 114). In Some of the control hardware and software for each individual storage drive is removed to the media unit controller and/or rack controller, thereby centralizing control functions of the individual storage drives to a media unit level and/or a rack level. By moving some or all of the storage drive control hardware and software into the corresponding media unit controller and/or rack controller, the individual storage drives may have disparate characteristics (e.g., storage technology (e.g., magnetic, optical, semiconducting), performance characteristics and power characteristics). Further, the individual storage drives may utilize any available storage technology (e.g., magnetic storage, optical storage, semiconducting storage (e.g., flash-based solid state)).

In one implementation, each storage drive is a distinct storage medium or set of storage media with a portion of the read/write control functionality of the storage drive removed to a corresponding media unit controller and/or rack controller of the off-line HDD mass data storage system. As a result, one or both of the media unit controller and/or the rack controller can selectively power (e.g., power-on, power-off, spin-up, spin-down, etc.) an individual storage drive as desired to read data from and/or write data to the storage drive without having to supply power to all storage drives within the off-line HDD mass data storage system 100 continuously.

In one implementation, the rack controller 118 is communicatively coupled to the media unit controllers (e.g., the media unit controller 114) the within corresponding rack 108, and the media unit controllers are each communicatively coupled to an associated nest of storage drives (e.g., a storage drive 116). Communication between the rack controllers and the media unit controllers is digital or primarily digital, and accomplished via signal transmission through various compute nodes, inter-integrated circuits ("I2C"), serial advanced technology attachment ("SATA"), serial attached small computer system interface ("SAS"), universal serial bus ("USB"), peripheral component interconnect express ("PCIe"), Ethernet, wireless channels, etc.

In one example implementation of use, the rack controller 118 receives a drive access (e.g., read/write) command and uses a detailed mapping of a power network and storage resources to identify available storage locations to receive data (if the command is a write command) or act as a data source (if the command is a read command). Using a number of power constraints and data requirements, the rack controller 118 instructs the zone board 114 to power up (e.g., from an off state) a particular storage drive and ready it for the drive access operation. Controllers on the zone board 114 switch power to the selected drive, power on the selected drive, and connect a read/write channel to the selected drive. After execution of the read or write command, the selected drives are returned to an off-line (powered off) state.

Since each of the media units 102, 104 in the rack 108 may include similar characteristics, a further description of the media units is provided with reference to the media unit 102. The media unit 102 includes an array of individual storage drives (e.g., hard drive assemblies (HDAs), such as an HDA 116) that share control electronics of an assembled a zone board, such as zone board 114. The zone board 114 integrates various controllers, switches, memory (e.g., storing firmware) power supplies, and other other electronics for controlling power and drive access (e.g., read write access) of the communicatively coupled storage resources within the media unit 102.

In one implementation, the zone board 114 is a printed circuit board assembly ("PCBA") that includes one or more controllers, such as one or more peripheral interface controllers ("PICs"), application-specific integrated circuits ("ASICs") and/or systems on chips ("SoCs"). Such controllers may be further connected to an array of switches (not shown) on the zone board 114 that communicatively couple to zone board 114 to individual storage drives through an interconnect 106.

In one implementation, controllers on the zone board 114 receive and process digital control signals. The controllers (e.g., drive access controller, switch controller, power controller, etc.) convert these digital signals to analog control signals, and output the analog control signals along appropriate lines through the interconnect 106 to targeted storage resources. Therefore, analog rather than digital control signals are transmitted through the interconnect 106.

The interconnect 106 replaces a traditional direct connection between a storage drive preamplifier (not shown) and associated control electronics, thereby facilitating a physical arrangement of drives within each media unit that allows a large number of storage drives to share the same zone board 114. In some implementations, the above-described system configuration also permits the individual storage drives in the media unit 102 to be individually removed, serviced, and/or replaced without affecting a flow of data to or from to any of the other storage drives sharing the same control electronics (e.g., the components of zone board 114).

Despite the above-described spatial gains that simplify drive and electronic layout complexities, implementation of the interconnect 106 within the media unit 102 introduces several design challenges that stem largely from the physical displacement of control electronics from the associated storage resources. Traditionally, drive control electronics are arranged to be in very close proximity to control electronics to prevent signal loss and distortion. For example, a drive access controller (e.g., an SoC) that sends read/write signals to a drive preamplifier of a storage drive may be situated about an inch away from the drive preamplifier. In contrast, the present design displaces these drive control electronics across a comparatively large distance, such as 10 times the traditional distance from associated drive components. This displacement entails transmittal of analog control signals through the interconnect 106. In one implementation, the analog signals passing across the interconnect 106 are drive proprietary (e.g., not standardized) signals that are at high RF and high power speeds. Examples of analog control signals transmitted through the interconnect 106 include without limitation controls to various drive motors (e.g., to power on/off a voice coil motor and/or spindle motor); read/write signals to and from a drive preamplifier; power signals, etc.

Signal loss traditionally associated with passing such analog signals through a standardized interconnect, such as the interconnect 106, is significant. Therefore, the presently-disclosed data storage system includes further hardware to compensate and correct for these losses. A few example details are discussed with respect to the following figures.

Figure 2:
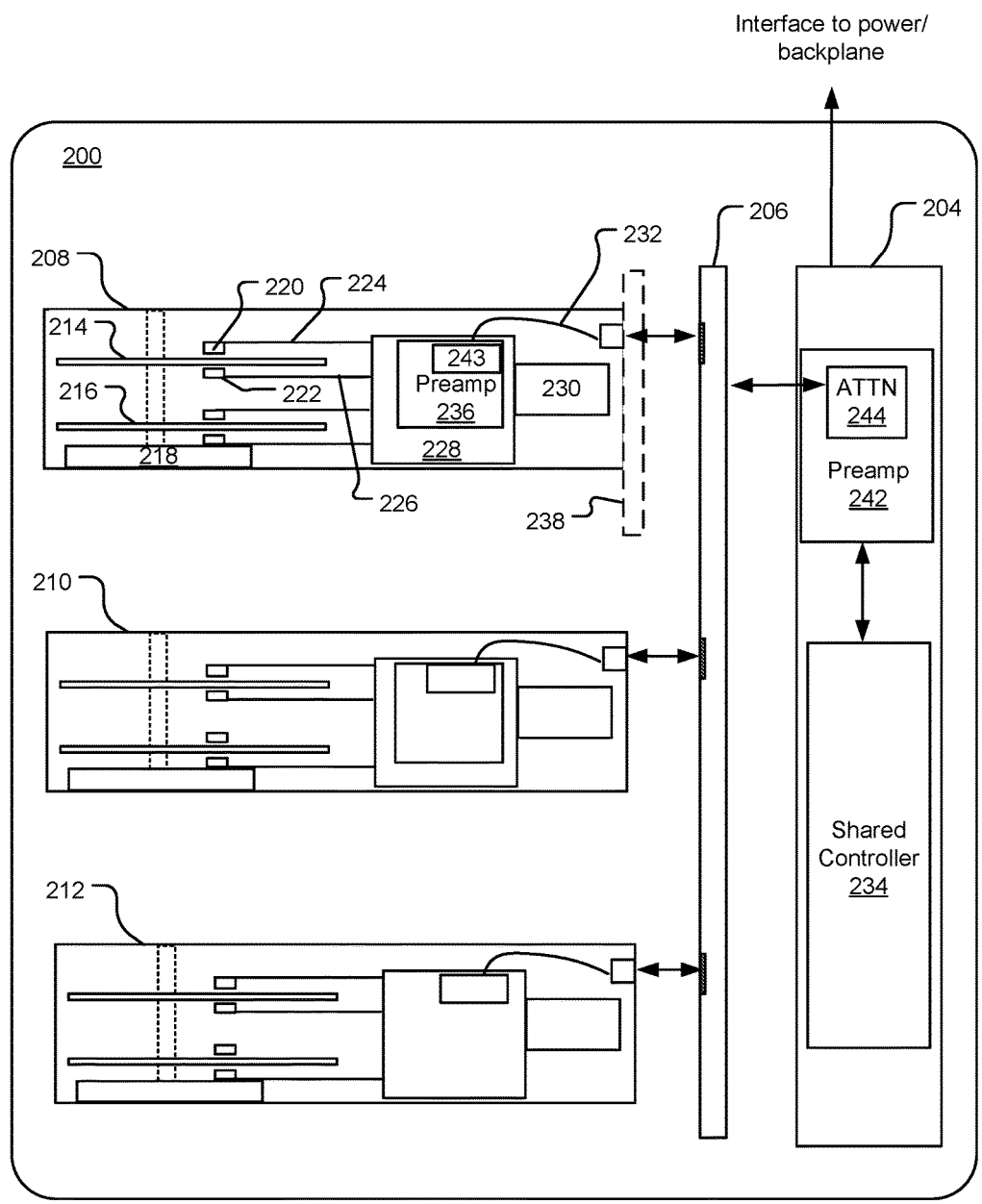
FIG. 2 illustrates an example zone board including control electronics coupled to an interconnect that facilitates sharing of the control electronics between multiple storage drives.

FIG. 2 illustrates an example media unit 200 coupled to an interconnect 206 that facilitates sharing of control electronics (e.g. electronics on a zone board 204) between multiple storage drives, such as example HDAs 208, 210, and 212. In some implementations, the media unit 200 is implemented in a rack with a number of other identical or non-identical media units, as generally discussed above with respect to FIG. 1.

Each of the HDAs 208, 210, and 212 includes at least one storage medium, and may include multiple storage media (e.g., magnetic disks 214 and 216) rotated about an axis of rotation by a spindle motor 218. Data is read from and written to each of the magnetic disks by one or more heads (e.g., heads 220, 222) positioned on distal ends of an actuator arm (e.g., actuator arms 224, 226) relative to an actuator body 228. Movement of the actuator arms 224, 226 is effected by a voice coil motor (VCM) 230 according to power signals received across a flex cable 232 from a shared controller 234 on the zone board 204. The flex cable 232 is also used for transmission of data signals (e.g., read and write signals) traveling to and from a preamp multiplexor (hereinafter "drive preamp 236") located on the actuator body 228. The drive preamp 236 includes a switch that controls separate channels for communicating with each of the heads (e.g., heads 220, 222) in the HDA 208. The drive preamp 236 may further include an attenuator 243 that attenuates incoming signals prior to amplification and attenuates outgoing signals post-amplification.

In some mass storage solutions, a separate drive controller is included within each individual hard drive assembly. The drive controller may, for example, take the form of one or more PICs, ASICs, and/or SoCs integrated on a drive PCB (not shown). A drive PCB may, for example, be located in direct contact with the flex cable 232, such as at an example position 238 indicated by a dotted box. This close proximity ensures high quality preservation of the high speed and power analog signals traveling between the shared controller 234 and the drive preamp 236.

In contrast, a shared controller 234 of FIG. 2 is shared between multiple HDAs in an associated media unit (e.g., HDAs 208, 210, 212) and is located on the zone board 204, separated from each of the HDAs 208, 210, and 212 by the interconnect 206. The interconnect 206 includes a variety of input and output ports that serve different functions, such as, for example providing propriety power signals to the spindle motor 218 and VCM motor 230, providing signals for selecting one or more read/write heads of the different heads (e.g., 220, 222), transmitting of propriety data signals to and from the magnetic disks 214, 216, etc.

Although the interconnect 206 of FIG. 2 couples the zone board 204 to three HDAs 208, 210, and 212, the interconnect 206 may, in other implementations, be used to facilitate any number of connections between storage resources and the zone board 204. For example, some implementations may allow eight or more HDAs to share control electronics.

The displacement of control electronics from the example position 238 (as in some systems) to the zone board 204 (e.g., within the shared controller 234) introduces a large travel distance between the drive preamp 236 and the control electronics. This distance introduces significant signal loss. Therefore, media unit 200 includes additional electronics on the zone board 204 that compensate and correct for these effects. Specifically, the zone board 204 includes a preamp multiplexor (hereinafter the "shared preamp 242").

The shared preamp 242 may further include an attenuator 244 that attenuates outgoing signals post-amplification and attenuates incoming signals prior to amplification. Although the attenuator 244 is shown to be a component of the shared preamp 242, the attenuator 244 may—in some implementations—be a separate component. The shared preamp 242 works in conjunction with the drive preamp 236 to preserve signal quality and amplitude. In one implementation, the shared preamp 242 is identical to the drive preamp 236.

Different channels of the shared preamp 242 are associated with different HDAs 208, 210, 212, etc. (as compared to the channels of the drive preamp 236, which are each associated with different heads in the HDA 208). Signals traveling from the HDA 208 to the shared controller 234 travel through the flex cable 232 to the interconnect 206. When the signals pass through the interconnect 206, significant signal loss occurs. The signals are then further attenuated by an attenuator 244 on the zone board 204, which in turn provides the attenuated signals to the shared preamp 242.

The shared preamp 242 on the zone board 204 expects a very small signal relative to that initially transmitted from the drive preamp 236 in the HDA 208. Therefore, the interconnect 206 and attenuator 244 serve the purpose of jointly contributing to attenuation of the initially amplified signal from the drive preamp 236 to a level that is expected by the shared preamp 242. In implementations where the drive preamp 236 and the shared preamp 242 are identical, the drive preamp 236 and the shared preamp 242 may expect signals of the same shape and amplitude.

When power and data access signals are transmitted from the shared controller 234 to the HDA 208, the reverse process occurs. Outgoing signals are passed through the shared preamp 242, amplified, and then directed through the attenuator 244. The attenuator 244 attenuates the amplified signal, and further attenuation subsequently occurs when the signals are passed through the interconnect 206. In effect, the attenuator 244 and interconnect 206 work together to shape the signals into a form that is expected by the drive preamp 236.

By amplifying, attenuating, and re-amplifying signals bi-directionally, as described above, the effects of signal loss due to the interconnect 206 are effectively eliminated.

Notably, the zone board 204 may include a number of control electronics that are omitted from FIG. 2 for simplicity. Some of these control electronics are discussed and/or shown with respect to FIGS. 3-4.

Figure 3:
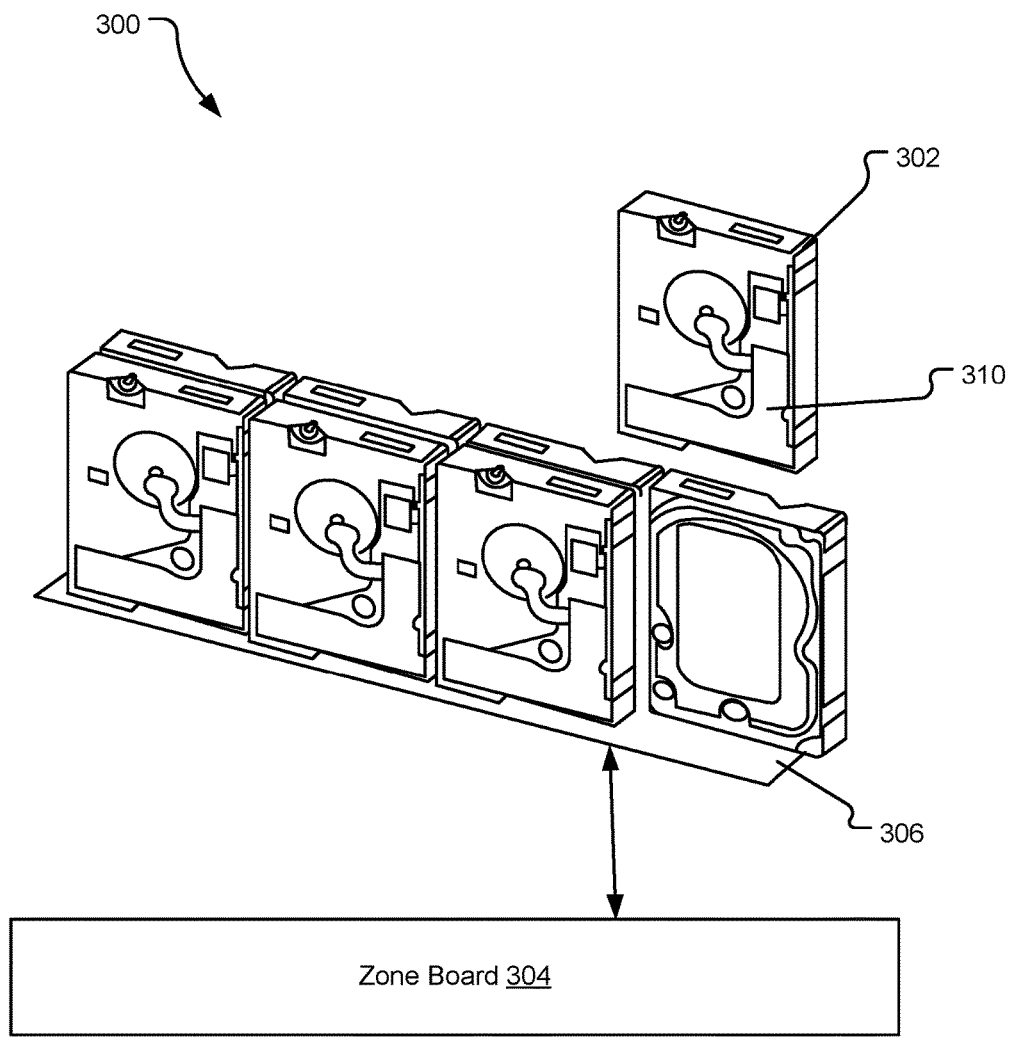
FIG. 3 illustrates a three-dimensional view of a storage system that includes storage drives that share control electronics.

FIG. 3 illustrates a three-dimensional view of a media unit 300. Although various implementations may include different numbers and types of storage resources, the media unit 300 includes an array of eight storage resources (e.g., a storage resource 310) that are removably coupled to an interconnect 306. Although the storage resources 310 are shown to be HDAs, the array may include other types of storage media in lieu of some or all of the HDAs. In one implementation, one or more of the storage resources 310 are SSDs. For example, the array may include exclusively SSDs or a combination of HDAs and SSDs. The interconnect 306 can be further coupled a zone board 304 that includes control electronics shared by the eight storage resources. Although a number of physical configurations are contemplated, the eight storage resources illustrated each have a longitudinal axis substantially orthogonal to a plane of the zone board 304 and the interconnect 306.

For example, the zone board 304 may include shared control electronics (not shown) for executing commands from a host and/or independent of the host, such as firmware commands stored in memory (e.g., DRAM) on the zone board 304. The drive controller may be tasked with execution of both data access (e.g., read/write) commands and drive control commands. Drive control commands refers to, for example, commands control some aspect of drive selection and/or drive operation, such as a command for selecting parameters for a preamplifier, checking security credentials, power control, checking on various configuration or power states of one or more drives within the media unit 300, selecting a specific address access path, checking a temperature within the media unit 300, etc.

The shared controller on the zone board 304 may further include a plurality of switches to implement the above-described and other data access and drive control commands. In one implementation, the zone board 304 includes an FET bank array including switches to select a drive preamplifier and to configure preamplifier settings; read/write switches to open appropriate read/write channels; switches to control the movement of an actuator to position various read/write heads; and/or switches to spin up or down the voice coil motor (VCM) on any one of the storage resources.

In addition to those elements described above, the zone board 304 may also include both volatile (e.g., D-RAM, S-RAM) and non-volatile memory (e.g., flash) for storing firmware. In one implementation, the zone board 304 includes one or more serial flash devices that store firmware that is copied to D-RAM when the zone board 304 powers up. Logical identifiers may be also be stored in memory of the zone board 304 and used to identify and select storage resources targeted by each incoming data access command.

Although some or all control electronics may be included on the zone board 304, some implementations may include a subset of control electronics on a "daughter PCB" (e.g., a daughter PCB 310) directly attached to each individual storage drive. Different designs with different space constraints may choose to partition the control electronics differently or not at all. For example, one implementation may locate all control electronics on the zone board 304. Another implementation may locate a majority of control electronics on the zone board 304, while locating select control electronics on the daughter PCB 310, such as electronics specific to each individual storage resource. For example, FETs for VCM and spindle motors of the HDA 302 may be located on the daughter PCB 310, while controllers for operating and switching to a target VCM and spindle motor are included on the zone board 304. In one or both of the above-described implementations, a shared drive controller is located on the zone board 304 and there is no controller (e.g., no SoC) located on the individual storage resources.

The interconnect 306 allows for easy, independent removal of each individual storage resource in the array. In this sense, any individual storage resource can be taken offline and repaired without affecting a power state or flow of data to any other storage resource in the array.

Figure 4:
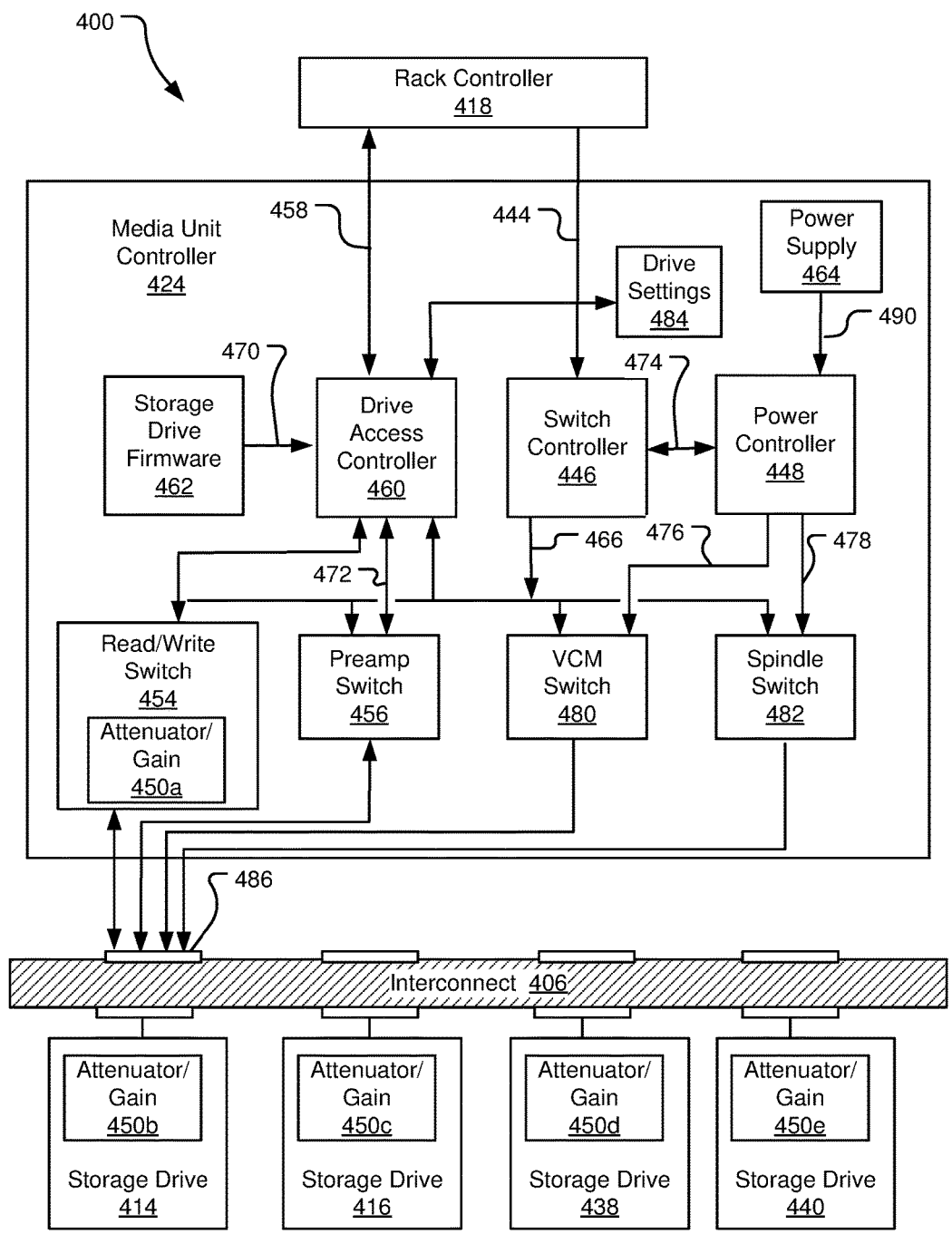
FIG. 4 illustrates an example storage system for selectively operating one of an array of connected storage drives via shared control electronics.

FIG. 4 illustrates an example storage system 400 for selectively operating one of an array of connected storage drives 414, 416, 438, 440 using a rack controller 418. The rack controller 418 orchestrates read/write requests within a corresponding rack of the storage system (see e.g., rack 108 of FIG. 1) and communicates digital control signals to each of a plurality of media unit controllers, such as a media unit controller 424. The media unit controller 424 may take the form of one or more PCBAs, PICs, ASICs, and/or SOCs, for example. In one implementation, all electronics of the media unit controller 424 are integrated onto a single PCBA.

In response to receipt of a data access (read/write) command from a host device, the rack controller 418 determines whether a target storage location is located within its associated rack and if so, where the target storage location is specifically located. The specific location is defined at an address level on one or more target storage drives within the rack. The rack controller 418 identifies a media unit controller (e.g., media unit controller 424) that is physically coupled to the target storage drive(s) and transmits a request to the media unit controller to read data from the target storage location (if the command is a read command) or to write new data to the target storage location (if the command is a write command).

In one implementation, the rack controller 418 communicates with a switch controller 446 (see arrow 444) to select and power on the one or more target storage drives, such as target storage drive 414, to enable subsequent execution of a data access command. The rack controller 418 may further communicate with a drive access controller 460 to request read data or send write data to the target storage drive 414. Signals to and from the drive access controller 460 and the switch controller 446 may assume a variety of different communication protocols including without limitation I2C, SAS, SATA, USB, PCIe, Ethernet, etc.

In one example implementation, the rack controller 418 communicates with the drive access controller 460 via a different communication protocol than the switch controller 446. For example, the rack controller 418 may communicate with the switch controller 446 using a I2C protocol (e.g., through a peripheral interface controller "PIC") and communicate with the drive access controller 460 via a SATA protocol. In another implementation, the rack controller 418 communicates with the drive access controller 460 via a same communication protocol as the switch controller 446.

The switch controller 446 is connected to an array of switches 454, 456, 480, 482 that selectively connect components of the media unit controller 424 to the connected storage drives 414, 416, 438, 440. The switch controller 446 instructs the individual switches to select the target storage drive 414 (see arrow 466). The switch controller 446 instructs a power controller 448 to provide power to the target storage drive 414 (see arrow 474). The power controller 448 shunts power from a power supply 464 (see arrow 490) through voice coil motor switch 480 (e.g., a field-effect transistor ("FET")) (see arrow 476) and a spindle switch 482 (e.g., also a FET) (see arrow 478). In other implementations, the power controller 448 may provide power to other components of the target storage drive 414 via additional switches.

Simultaneously or subsequent to the switch controller 446 target storage drive(s) for a data access operation, the rack controller 418 sends a data signal (see arrow 458) to the data access controller 460 (e.g., in a file format, an object format, or a block format) combined with metadata and/or data control information to the drive access controller 460. The drive access controller 460 controls read/write operations on the individual storage drives 414, 416, 438, 440 connected to the media unit controller 424 based on the data, metadata, and/or control information within the in-band signal 458. Responsive to receipt of the data signal from the rack controller 418, the drive access controller 460 accesses storage drive firmware 462 (e.g., dynamic random access memory ("DRAM")) to retrieve operating protocols on the active storage drive 414, as illustrated by arrow 470.

More specifically, the drive access controller 460 sends a preamp (or preamplifier) control signal via a serial interface or other command connection through preamp switch or preamplifier switch 456 (e.g., a multiplexer switch or MUX) to operate storage drive 414 (see arrow 472).

An interconnect 406 serves as an input/output interface between the media unit controller 424 and the storage drives 414, 416, 438, and 440. The interconnect 406 includes a number of ports (e.g., a port 486) that collectively facilitate bi-directional data transfer between the media unit controller 424 and each of the storage drives 414, 416, 438, and 440. In one implementation, data signals crossing over the interconnect 406 are analog data signals.

In at least one implementation, the storage drives 414, 416, 438, and 440 do not include individual controllers. For example, the storage drives do not physically include an SoC or PIC that couples to an internal drive preamplifier. Like power and motor control signals passing across the interconnect 406 between the storage drives and the switch controller 446 or the power controller 448, data read from the target storage drive 414 or data written to the target storage drive 414 is transmitted in the form of analog signals across the interconnect 406 between the media unit controller 424 and the target storage drive 414.

Each of the storage drives 414, 416, 438, and 440 includes an attenuator in series with an amplifier, represented by Attenuator/Gain blocks 450*b*, 450*c*, 450*d*, and 450*e*, respectively. When write data is transmitted to the target storage drive 414, the outgoing write data is amplified and then attenuated within an Attenuator/Gain block 450*a* of a Read/Write switch 454 (e.g., a radio frequency or microwave switch). The data signal is further attenuated via transmission through the interconnect 406, and then further attenuated and re-amplified by the Attenuator/Gain block 450*b* within the target storage device 414. In one implementation, the Attenuator/Gain blocks 450*b*, 450*c*, 450*d*, and 450*e* are identical to one another and also identical to an Attenuator Gain block 450*a* within a read/write switch 454 on the media control unit 424.

Outgoing analog read data read from the target storage drive 414 amplified and subsequently attenuated by the Attenuator Gain block 450*b*, attenuated further via transmission back through the interconnect 406, and then attenuated and subsequently re-amplified by the Attenuator/Gain block 450*a* within the read/write switch 454 in route to the drive access controller 460, which sends the read data back to the rack controller 418 for transmission outbound from the mass data storage system.

Read and write control signals transmitted from the drive access controller 460 may be finely tuned to compensate for noise introduced by the preamp switch 456 and adjacent equipment between the drive access controller 460 and the storage drive 414. In some implementations, the preamp switch 456 is a radio frequency or microwave switch that minimizes such interference and the connections between the drive access controller 460 and the storage drive 414 are shielded to reduce/prevent noise from interfering with the read/write signal. Further, in some implementations, the preamp switch 456 is the same as or similar to a head switch used within a storage drive containing multiple heads.

In various implementations, the storage drives 414, 416, 438, 440 each have disparate performance characteristics, operating conditions, and/or configuration data. As a result, drive settings may be updated at the drive access controller 460 to ensure that data is properly written to the active storage drive 414. In one implementation, the drive access controller 460 is connected to a drive settings database 484 (e.g., electrically erasable programmable read-only memory ("EPROM")) and pulls configuration data (e.g., in the form of a configuration table) from the drives settings database 484 specific to the active storage drive 414. In some implementations, the drive access controller 460 consults the drive settings database 484 every time the media unit controller 424 performs a new power up operation.

Aspects of the media unit controller 424 and/or rack controller 418 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules, or other data resident in a modulated data signal, such as a carrier wave or other signal transport mechanism.

Figure 5:
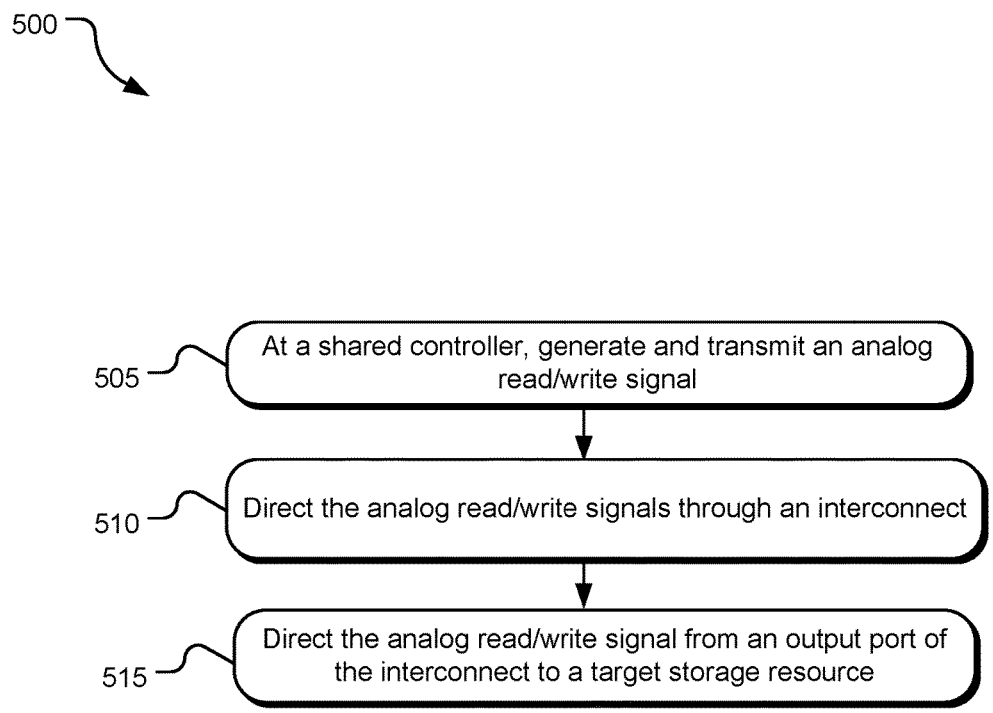
FIG. 5 illustrates example operations for performing data access operations on storage drives via shared control electronics within a mass data storage system.

FIG. 5 illustrates example operations 500 for performing data access operations on one of an array of connected storage resources using instructions from shared control electronics within a mass data storage system. The shared control electronics are configured to independently select and power each of the connected storage resources A signal generation operation 505 generates and transmits a read/write signal from the shared control electronics. The shared control electronics are, in one implementation, located on a PCB (e.g., a zone board) that is separated from the storage devices in the array by an interconnect. The PCB may include a variety of other control electronics include preamplifier switches, power control switches, read/write switches, etc. The analog read/write signal is directed to a target storage drive among a plurality of selectable storage drives coupled to the shared controller.

A directing operation 510 directs the transmitted analog read/write signals though an interconnect that bi-directionally couples each of the plurality of selectable storage resources to the shared controller. In one implementation, the read/write signals are amplified on the PCB and then attenuated by a select amount before being directed through the interconnect. The interconnect further attenuates the signal. In one implementation, the target storage resource is an HDA and the interconnect attenuates the signal by an amount such that the signal is in a form (e.g., amplitude and shape) expected by a drive preamp of the target storage device.

In one implementation, the analog read/write signals directed through the interconnect are further directed to a flex cable of the target storage drive that is connected to an output port of the interconnect.

Another direction operation 515 directs the analog read/write signal from an output of the interconnect to a target storage resource among the plurality of selectable storage resources communicatively coupled to the interconnect.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
control electronics on a printed circuit board assembly (PCBA) and shared by multiple independently-selectable storage drives; and
an interconnect separating the PCBA from the multiple independently-selectable storage drives, the interconnect intercepting analog read/write signals each transmitted from the control electronics to a preamplifier within a target one of the independently-selectable storage drives, the interconnect bi-directionally coupling the control electronics to each of the independently-selectable storage drives.

2. The system of claim 1, wherein the analog read/write signals are not intercepted by any controller between the interconnect and read or write heads of the multiple independently-selectable storage drives.

3. The system of claim 1, wherein the interconnect includes a plurality of output ports each coupled to a flex cable of one of the multiple independently-selectable storage drives.

4. The system of claim 1, further comprising:
a shared preamplifier coupled to each of the multiple independently-selectable storage drives and configured to receive and amplify the transmitted analog read/write signals from the control electronics; and
a shared attenuator coupled to each of the multiple independently-selectable storage drives and configured to receive and attenuate the analog read/write signals amplified by the shared preamplifier and to provide the attenuated analog read/write signals to the interconnect.

5. The system of claim 4, wherein each of the multiple independently-selectable storage drives includes a flex cable coupled to a drive preamplifier, and the drive preamplifier re-amplifies the analog read/write signals attenuated by the shared attenuator.

6. The system of claim 5, wherein the shared preamplifier and the drive preamplifier are substantially identical.

7. The system of claim 1, wherein the multiple independently-selectable storage drives each have a longitudinal axis orthogonal to the PCBA.

8. The system of claim 1, further comprising:
a shared preamplifier and a shared attenuator on a first side of the interconnect, the shared preamplifier configured to amplify the transmitted analog read/write signals and provide the amplified read/write signals to the shared attenuator in route to the interconnect; and
a drive preamplifier on a second side of the interconnect, the drive preamplifier configured to reamplify the analog read/write signals attenuated by the shared attenuator on the first side of the interconnect.

9. A method comprising:
transmitting an analog read/write signal from a shared controller on a printed circuit board assembly (PCBA), the analog read/write signal directed to a target storage drive among a plurality of independently-selectable storage drives coupled to the shared controller; and passing the analog read/write signal through an interconnect that separates the PCBA from the multiple independently-selectable storage drives and bi-directionally couples each of the plurality of independently-selectable storage drives to the shared controller.

10. The method of claim 9, wherein each of the plurality of independently-selectable storage drives can be independently disconnected from the interconnect without affecting a power state of any other one of the plurality of independently-selectable storage drives.

11. The method of claim 9, wherein the transmitted analog read/write signal is not intercepted by any controller between the interconnect and read or write heads of the plurality of independently-selectable storage drives.

12. The method of claim 9, further comprising:
receiving and amplifying the transmitted analog read/write signal at a shared preamplifier on the PCBA, the shared preamplifier coupled to each of the multiple independently-selectable storage drives;
receiving and attenuating the amplified analog read/write signal at a shared attenuator on the PCBA, the shared attenuator coupled to each of the multiple independently-selectable storage drives; and
directing the attenuated analog read/write signal to the interconnect.

13. The method of claim 12, further comprising:
re-amplifying the attenuated read/write signal by a drive preamplifier of the target storage drive; and
providing the re-amplified signal to a read or write head.

14. The method of claim 13, wherein the shared preamplifier and the drive preamplifier are substantially identical.

15. The method of claim 9, further comprising:
amplifying the transmitted analog read/write signals at a shared preamplifier on a first side of the interconnect;
providing the amplified read/write signals to a shared attenuator on a first side of the interconnect prior to passing the analog read/write signal through the interconnect; and
re-amplifying the analog read/write signals attenuated by the shared attenuator by a drive preamplifier on a second side of the interconnect.

16. A system comprising:
a shared controller on a printed circuit board assembly (PCBA) and configured to provide a read/write signal directed to a target storage drive of multiple independently-selectable storage drives;
a shared preamplifier on the PCBA and configured to receive and amplify the read/write signal from the shared controller;
a shared attenuator on the PCBA configured to receive and attenuate the amplified read/write signal from the shared preamplifier; and
an interconnect coupled to each of the independently-selectable drives, the interconnect separating the PCBA from the multiple independently-selectable storage drives and configured to receive an analog output signal of the shared attenuator and provide the analog output signal to a drive preamplifier of the target storage drive.

17. The system of claim 16, wherein each of the multiple selectable storage drives can be independently disconnected from the interconnect without affecting a power state of any other one of the multiple independently-selectable storage drives.

18. The system of claim 16, wherein the analog output signal is not intercepted by any microprocessor between the interconnect and read or write heads of the target storage drive.

19. The system of claim 16, wherein a flex cable of the target storage drive provides the analog output signal to a drive preamplifier of the target storage drive.

20. The system of claim 19, wherein the drive preamplifier is substantially identical to the shared preamplifier.

* * * * *